May 23, 1939.  H. T. LIVINGSTON  2,159,094
TABULATING MACHINE
Filed April 4, 1934   5 Sheets-Sheet 1

| 2510 | 2516* | 7*  | 249.76* |
| 2527 | 2533* | 7*  | 171.14* |
| 2571 | 2586* | 16* | 826.26* |

INVENTOR
Harry T. Livingston
BY
ATTORNEY

May 23, 1939. H. T. LIVINGSTON 2,159,094
TABULATING MACHINE
Filed April 4, 1934   5 Sheets-Sheet 2

INVENTOR
Harry T. Livingston
BY
W. M. Wilson
ATTORNEY

May 23, 1939.  H. T. LIVINGSTON  2,159,094
TABULATING MACHINE
Filed April 4, 1934  5 Sheets-Sheet 5

FIG.9.

Patented May 23, 1939

2,159,094

UNITED STATES PATENT OFFICE 2,159,094

TABULATING MACHINE

Harry T. Livingston, Brooklyn, N. Y., assignor to International Business Machines Corporation, New York, N. Y., a corporation of New York Application April 4, 1934, Serial No. 718,903

13 Claims. (Cl. 235—61.7)

This invention relates to accounting devices for comparing successively entered data to determine whether a predetermined relationship exists between the successive items of data. The idea is embodied in a record controlled machine where the index points of the successive cards are compared to check whether the index point designations are in arithmetical progression.

An object of the invention is to provide means for printing a record to show where groups of numbers fail to follow in consecutive order.

An object of the invention is to provide means for printing a pair of serial numbers which identify a plurality of consecutively numbered articles in a group. The first or lowest and the last or highest serial numbers of each group are printed adjacent each other on a record. The articles not included in the groups may be identified by noting the interval of missing numbers between the last number of each group and the first number of the following group.

It is an object of the invention to provide means for printing the record of groups of serial numbers at a high speed. The invention is disclosed as an improvement in a perforated record card controlled tabulating machine. In the compilation of the record, the machine is run at the higher of two speeds, namely, at tabulating rather than listing speed. The machine pauses only to print when changing from one group to the next.

Another object of the invention is to provide devices for sensing a break in consecutive numbering in any denominational order of serially marked records. Thus, it is possible to detect missing serial numbers in other than the units order. For example, an interval of 1,000 is detected as surely as a gap of a few units.

An example of the usefulness of the present invention may be pointed out in connection with a problem in bank work. Before bank papers such as a recalled serial issue of bonds, stocks, etc., are burned, it is desired to make a composite record of the numbers of the papers about to be destroyed and at the same time have the record arranged so that it is easy to note the numbers of missing papers. In order to print such a record automatically, a set of record cards are perforated. Each card is punched to represent the serial number and amount appearing on one of the papers to be destroyed. Then all the cards are arranged in numerical order with the card bearing the lowest number leading and the other cards following with the numbers in sequential order. Because of the missing papers and corresponding missing perforated cards, there will appear interruptions or gaps in the regular order of the numbers on the cards. Thus, the set of cards will comprise groups bearing numbers in consecutive order. The cards are placed in a tabulating machine designed according to the present invention. There they are fed in succession and the number perforations are sensed. The machine is adapted to print the first number of a group, then feed the cards rapidly as long as the numbers thereon continue in consecutive order, stop at an interruption in the numbers and print the last number of the group before going through the same cycle again. By printing the first and last number of each group of consecutively numbered cards, a record is made by which it is possible to identify all destroyed papers and all missing papers. It is obvious that a more compact record is produced by printing only the end numbers of each sequence of numbers instead of printing all the numbers in each sequence.

In addition to recording the serial numbers, the machine is adapted to count and print the number of cards in each sequential group and add and print the several amounts appearing on the cards of a group. All the data concerning a consectively numbered group of cards are printed on a single line of the record.

A feature of the present invention is the devices for comparing successive record cards and testing the comparative magnitude of the numbers thereon to determine whether they are numbered in sequence. An accumulator is used to add a small number of the sequence when one of the leading cards is sensed. Thereafter, a unit is added in the accumulator before each successive card sensing operation. Thus, the number in the accumulator grows in a simple arithmetical progression as the cards are fed one by one. After the first card number is accumulated, the number on each card is compared with the number in the accumulator to determine whether the sequence is maintained. Feeding of the cards continues as long as the numbers thereon are in order. However, as soon as a break or interruption occurs in the sequence of the numbers it is revealed by the comparison with the accumulator. Then feeding is stopped while a record is printed of the last number in the sequence.

An object of the invention is to provide card comparing devices comprising commutators adjusted by an accumulator. After the adjustment of the commutators to represent a predetermined number, connections are made to card sensing devices to determine whether the same number is represented on a card. The index points on the card are analyzed in synchronism with the selection of related segments on the commutator. If there is perfect agreement, an electric circuit is established, the machine continues to run, a single step of adjustment is made in the accumulator and connected commutator and the number of the following card is compared with the advanced reading of the commutator.

An object of the invention is to provide other card comparing devices comprising commutators adjusted by a pair of accumulators. The numbers on two successive cards are added in the separate accumulators. The smaller number which is on the first card is added to the number 2 which is allowed to remain in the accumulator after the previous resetting operation. The larger number on the second card is added to a unit in the second accumulator. The connected commutators are thus adjusted by the settings of the accumulators. If the two numbers on the cards are in sequence (i. e. if the larger number is greater than the smaller number by one unit) the settings of the two accumulators and commutators will coincide. The corresponding segments of the two commutators are connected in a series circuit running back and forth between the two commutators. If the setting of the commutators coincide, indicating a proper sequence of numbers, the series circuit is energized and the machine continues to run.

Another object of the invention is to provide an advanced form of automatic group control device in which control is exercised between groups wherein each group comprises consecutively numbered records. In the usual form of group control, the records of each group bear similar numbers rather than consecutive numbers.

As each group of consecutively numbered records passes through the machine, the records are counted, and when a change in group occurs a total of the count is printed to record the number of items in the group.

The amounts appearing on each group of records are added. When an interruption of the sequence occurs a total of the added amounts is printed to record the total amount in all the items of the group.

An object of the invention is to make the group control devices adapted for either similar or consecutive group number control. A selection of either type of control may be made before operation of the machine.

A feature of the invention is the devices for printing the first and last numbers of a sequence of numbers represented on record cards. The number on the first card is added in an accumulator which also receives a unit for each following card feeding cycle until the sequence is interrupted. Then a total printing operation under control of the accumulator serves to print the last number of the sequence without referring to the card carrying said last number.

These and other objects of the invention will be apparent as the specification continues with reference to the drawings which accompany and form part of the specification. The various views in the drawings may be noted as follows.

The invention is embodied in a machine of the type disclosed in Patent No. 1,762,145 issued June 10, 1930, to G. F. Daly et al. Reference may be made to the patent for an understanding of the ordinary tabulating mechanism.

Figures 1, 2, 3:
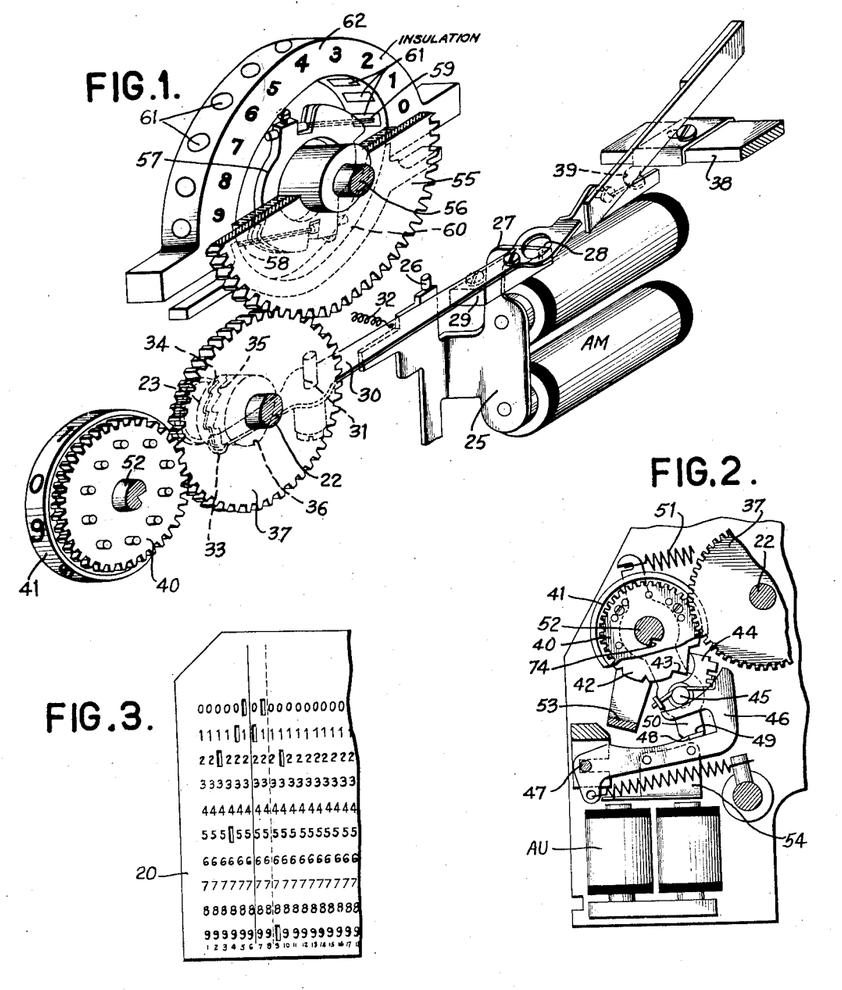
Fig. 1 is a perspective view of one denominational order of the accumulating devices. Associated with the accumulating devices in this view there is also shown settable commutators from which a reading may be taken of the amount in the accumulator.
Fig. 2 is a side view in section showing transfer mechanism associated with the lowest order of an accumulator and a control magnet for operating the mechanism to cause the entry of a unit.
Fig. 3 is a detail view of a portion of a perforated record card which carries a number 2510 and amount of $10.92.

In Fig. 3 there is shown a portion of a perforated record card 20 of the regular Hollerith form. The card is punched to represent the number 2510 and an amount of $10.92. This card may represent a serial numbered article such as a bond certificate with the number 2510. A series of such cards, one card for each article, may be perforated to represent the numbers of groups of serial numbered articles.

The cards are sorted according to number and arranged with the lowest number card first and the other numbers following in order.

Figure 6:
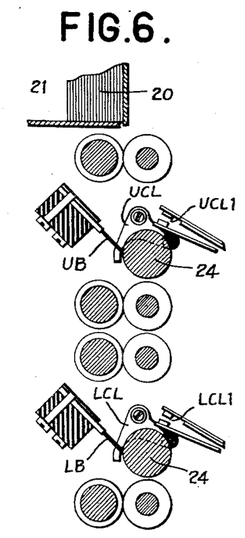
Fig. 6 is a sectional elevation view taken through the two sensing stations through which the record cards pass in succession.

After the cards are arranged, they are placed in the feeding magazine 21, Fig. 6, of the tabulator and driving connections are established to feed the cards one by one past two lines of perforation sensing brushes UB and LB. Because of their location these brushes are termed upper sensing brushes UB and lower sensing brushes LB. Each card is directed under the upper brushes and then exactly one cycle later it is sent under the lower brushes in synchronism with the movement of the following card under the upper brushes. As a card passes the upper brushes UB it operates a card lever UCL which then closes contacts UCLI.

Associated with the other brushes LB is a similar card lever LCL which is operated by a passing card to close the contacts LCLI. The function of these contacts is described hereinafter.

As a card is sensed the number or amount represented thereon may be added by the accumulating devices shown in Fig. 1. Although only one order or bank is shown in the illustration, it will be understood that other similar banks may be provided in making up a multidenominational accumulator. In the accumulator, a shaft 22 and a clutch collar 23 keyed thereon are rotated in synchronism with the feeding of the card 20, Fig. 6, past the sensing brush UB or LB which may be connected to the accumulator control magnet AM. At a time determined by the differential location of a perforation at one of the index points in a column on the card, a contact is made through the card between the brush and a contact roller 24 and an impulse is directed through magnet AM. The energized magnet attracts the associated armature 25 rocking it about pivot 26 and moving a projection 27 thereon out of the path of a shoulder 28 on a block 29 secured to a lever 30. The lever is then free to rock counterclockwise on a stud 31 under the urging of a spring 32. A ball and groove joint 33 forms a loose connection between one end of the lever 30 and the axially movable clutch collar 23. The movement of the lever 30 serves to bring teeth 34 on the clutch collar 23 into cooperation with teeth 35 on a hub 36 fastened to an accumulator driving gear 37. The number of steps that the gear 37 moves is determined by the time that the clutch connection is made, and that in turn is determined by the time of energization of magnet AM under control of the record card.

If the perforation sensed represents the number 9 for example, then the clutch is operated early in the cycle to drive the gear through nine steps. If the number is smaller, the clutch is operated later in the cycle to drive the gear through a corresponding smaller number of steps.

At the end of each adding operation, the lever 30 is operated to disengage the clutch teeth 34, 35 and to restore the shoulder 28 against the projection 27 ready for another operation. The clockwise restoring movement of lever 30 is produced by a sliding bar 38 which carries a projection 39 contacting the right end of lever 30.

In mesh with the gear 37 is a gear 40 carrying an indicator wheel 41. Between the adjacent accumulator gears 40 of an accumulator are transferring devices for carrying units from lower to higher orders as the lower order wheels pass from 9 to 0.

Attached to the gear 40, Fig. 2, is a cam 42 with a projecting tooth 43. As the gear 40 passes from the 9 to 0 position, the tooth strikes an extension on a pawl 44 pivoted at 45 and cooperating with a latch lever 46 pivoted at 47. When the lever 46 is thus operated, a shoulder 48 thereon is withdrawn from the path of a lug 49 on a lever 50 which carries a pawl 44 in the next higher order. A spring 51 urges the released lever 50 forward in a clockwise direction about shaft 52 as a center. The carry pawl 44 on the higher order carry lever 50 is adapted to turn the next cam 42 and connected gear wheel 41 one step when the lever is restored to normal position. A restoring bale 53 pivoted on shaft 52 is adapted to move all of the tripped levers 50 back to the normal latched position.

A special magnet AU may be provided in the units order bank of an accumulator to enter an extra unit for reasons explained more fully hereinafter. The magnet cooperates with a transfer mechanism associated with the units order wheel. Whenever an extra unit is needed, the magnet AU is energized thereby attracting an armature plate 54 secured to the latch lever 46. The resulting movement of latch 46 released the transfer lever 50. The transferring operation then takes place to turn the units accumulator gear wheel 41 one step in the usual way.

Associated with each accumulator order are reading out devices or commutators which are adjusted by the accumulator gear to register the number contained therein so that the same number may be printed as a total or compared with another number on a card or in another accumulator. One of such commutator devices is shown in Fig. 1. There it is noted that the driving gear 37 is in mesh with another gear 55 loosely mounted on a shaft 56 and carrying a brush holder 57 containing two brushes 58 and 59. As the holder is adjusted to a differential position of the accumulator gear, the one brush 58 touches a common contact sector 60 while the other brush 59 contacts one or another of the series of segments 61 arranged in an arc around the insulated frame 62 of the commutator. Each segment 61 corresponds to a digit and receives a timed impulse varied according to the value of the digit. As explained more fully hereinafter, a printing or comparing circuit is completed through the brush holder 57, the brushes 58, 59 and the particular segment 61 contacted thereby.

Figure 4:
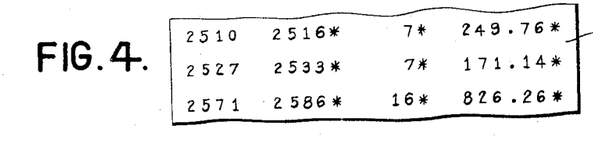
Fig. 4 is a view showing a portion of a printed record sheet showing the printed items associated with three groups of consecutively numbered record cards.
Figure 5:
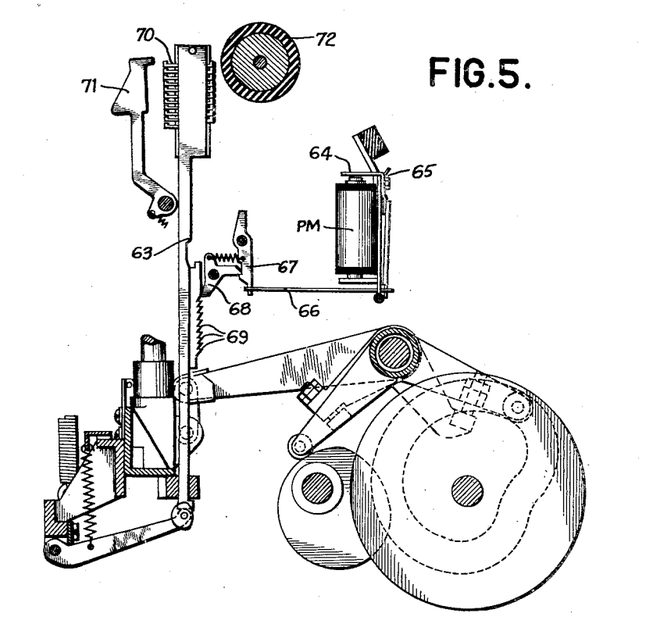
Fig. 5 is an elevation view of the printing devices.

The printing devices of the tabulator are adapted to be controlled for the printing of items and totals. Item printing is controlled by sensing the perforations on a record card as it passes under the lower brushes. Total printing is controlled by directing timed impulses through the commutator segments, thus taking a reading of the amount in the accumulator. The print controlling impulses are timed in synchronism with the lifting of the type bar 63, Fig. 5. When an impulse is initiated it is directed through the print control magnet PM which then attracts an associated armature lever 64 pivoted at 65. Attached to the end of an arm on the armature lever 64 is a call wire 66 connected to a latch 67 for releasing a pawl 68 which is adapted to engage a selected one of the shoulders 69 on the typebar, thus holding the typebar in a position with a particular type element 70 at the printing line between the hammer 71 and the platen 72. An impression is then made on a record sheet 73 a sample of which is shown in Fig. 4.

After the numbers on the accumulators have been read in comparing or total printing, the accumulator wheels may be reset to zero position. This is done by turning the notched shaft 52, Figs. 2 and 7, through one revolution in a counterclockwise direction. A shoulder formed by a notch 74 in the shaft 52 engages the resetting pawls 75 on the accumulator wheels 41 and turns the wheels back to the normal position.

Figure 7:
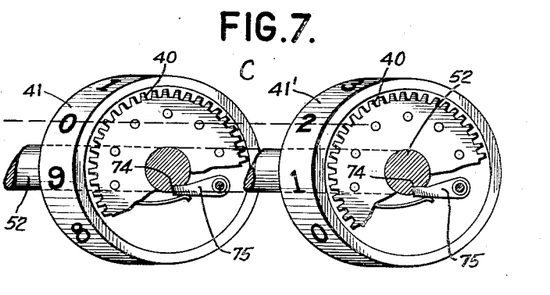
Fig. 7 is a perspective view of two totalizer wheels showing the association of the resetting pawls thereon with the notched resetting shaft.

The resetting pawl 75 on the units order wheel 41', Fig. 7, of one of the accumulators is arranged in a special way. It is located so that as the other wheels of the accumulator are restored to 0, the units order wheel is turned to 2. This is done because the accumulator is used in a special way for the comparison of consecutive numbers as explained hereinafter.

The cooperation between all of the devices mentioned hereinbefore, and the general operation of the machine may be explained by reference to the wiring diagram in Figs. 8 and 8a. When the switch PS is closed, current is available to all of the electrical devices of the machine through the main lines 100 and 101. The closing of the switch MS1 energizes the magnet MSR which serves to operate various contacts to condition the machine for the special comparing control of the present invention. Depression of the start key initiates the energization of the main driving motor TM which serves to drive the card sensing, adding and printing devices of the machine in a well known manner. Patent No. 1,762,145 may be referred to for an explanation of general tabulating machine operation. It should be noted that the machine is adapted to be driven at two different speeds. The slow operation being in effect for listing (i. e. when each item is printed) and the fast operation being used for tabulating (i. e. when only totals are printed).

The reset key is first operated, as usual, to insure the clearance of the accumulators by operation of the reset motor RM, and at the same time the P cams are operated so that contact P5 is closed to set up the group control relay MCR. Relay MCR closes contacts 107 and opens contacts 109 to prevent automatic resetting after the first starting cycle. Then the start key is depressed to close contacts 103. The starting circuit may be traced from line 100 through contacts P1, clutch magnet CLM, contacts 27a, clutch relay magnet CM2, stop key contacts 102, start key contacts 103, stop key contacts 104, and through contacts L2 and L1, or contacts 107 and RS, to line 101. Energization of magnet CLM opens contacts 27a and then the circuit includes motor relay magnet MRM which is wired in parallel with the contacts 27a. The closing of contacts 105 by the energized magnet MRM closes the motor circuit and the energized motor TM drives the feed shafts to feed the cards from the magazine. Energization of the start relay magnet CM2 will effect closure of associated contacts 108 to set up a holding circuit for the clutch magnet CLM traceable from line 120, through contacts P1, magnet CLM, relay MRM, magnet CM2, contacts 108, cam contacts L1 to line 101. Near the end of the cycle, cam contacts L1 open (Fig. 9) to deenergize relay MRM but, immediately thereafter, contacts 106 are closed to start another cycle. A shunt circuit is formed around the start key contacts 103 and contacts 102 when the magnet UCLR1 is energized to close contacts 106 as the first card arrives at the upper card lever contact UCL. This shunt circuit through contacts 106 and L12 serves to pick up a circuit through motor relay MRM and contacts 108 so that contacts 105 are closed for a second cycle. The circuit is through line 100, contacts P1, clutch magnet CLM, motor relay magnet MRM, clutch relay magnet CM2, contacts L12, 106, 104, and 107 and switch RS to line 101. During this second cycle, the first card is advanced to the lower brushes and as it does so it is read by the upper brushes and the number thereon added in accumulator A but, since a reset cycle follows directly thereafter, this number is cleared out of the accumulator when it is reset to zero. Accumulator A is in condition to add with contacts GIC closed, because magnet GIM remains deenergized during the number entering part of this second start cycle. This is so because when contacts L8 (Fig. 8) were closed during the previous cycle, contacts 133 were not closed, since the upper card lever had not yet been operated by the first card. However, at "1" in this second cycle, contacts L8 close (Fig. 9), contacts 133 are closed (Fig. 8a) and magnet GIM is energized to open contacts GIC after the number is added in accumulator A. As the card approaches the lower brushes, contacts L5 open, relay MCR is deenergized, contacts 109 close, and late in the cycle contacts L3 close to initiate what may be called a secondary reset cycle.

The secondary reset cycle serves not only to reset accumulator A but also to restore contacts GIC mechanically to a closed condition, as explained hereinafter, and to close contacts P6 so that magnets IRM are energized. The cycle serves further to close contacts P5 so that control relay MCR is again made effective to close contacts 107 to initiate a secondary auto start circuit through relay MRM, magnet CM2, contacts 102, switch AS, contacts P2, and lever contacts 99 and contacts 107.

On this secondary auto start cycle, the first card of the first group is fed past the lower brushes while the second card passes under the upper brushes. As this is done, the number on the first card is added in accumulators C and D while the number on the second card is added in accumulators A and B. The numbers in accumulators B and C are compared during this same cycle but the number in accumulator A has a unit added thereto, and the total in A is used for comparison starting with the next cycle when the third card passes the upper brushes. During this same secondary auto start cycle, contacts L8 close to energize magnets GIM and open contacts GIC in order to disconnect accumulators A and B from the upper brushes. Then contacts L6 open to deenergize magnets IRM allowing contacts 135 to close for subsequent group control comparing between the readout devices A' of accumulator A and the upper brushes. Later in the same cycle contacts L5 open momentarily to deenergize the motor control relay MCR. However, if the comparison of numbers in accumulators B and C shows that the first and second card contain consecutive numbers, then relay CPR is made effective to close contacts 197 later in this secondary auto start circuit to reenergize relay MCR to continue operation of the machine. The machine continues to run thereafter under control of the group control devices which sense and compare the total amount appearing in accumulator A and the numbers on successive cards sensed by the upper brushes.

From the foregoing section of the description, it is apparent that the machine passes through four different cycles of operation before it reaches the cycle wherein comparing is started. The cycles are the initial reset cycle, the key operated start cycle, the automatic start cycle, and the secondary reset cycle which is followed by the secondary auto start cycle. It is during the latter cycle that a group change between the first and second cards is sensed under control of accumulators B and C. If there is no such group change, then the machine continues to operate and, starting with the next cycle, control is shifted to accumulator A which detects changes in consecutive numbering starting with the second card of the group. Upon a group change effected under control of accumulators B and C, or under control of accumulator A and the upper brushes, an automatic reset cycle is effected when contacts L5 open to test the condition of the group control contacts GCC.

The operations outlined briefly hereinbefore are described in greater detail as this description continues with further reference to the wiring diagram.

There is no difference in the initiation of machine operation for straight tabulating operations as distinguished from operation to start comparing successively numbered cards. However, when the latter control is desired, switch MS1 is closed to cause the initiating operations to effect novel control over the machine, as noted in the foregoing outline of operation.

When the machine is running, the motor control circuit is maintained through contacts 107 held closed by a motor control relay MCR. The circuit is then arranged from line 100, contacts P1, magnet CLM, magnet MRM, contacts 108 closed by clutch relay magnet CM2, contacts 106, contacts 104, contacts 107, switch RS to line 101.

As the motor TM is operating, the resistance R is put in series with the shunt winding of the motor to speed up the same when the list cam contacts LCC open during tabulating operation.

Contacts 107 open and associated contacts 109 close when the magnet MCR is deenergized by a change in card group or an interruption in consecutive numbering when under automatic control. A resetting and total taking control circuit is then set up through contacts 109. The circuit may be traced from line 101, through switch RS, contacts 109, then through contacts 110 and 111 if operating under comparing control according to the present invention, contacts L3, closed switch ARS, magnets LTCM and RCRM in parallel, magnet RCM, contacts P3 and contacts L4 to line 100. The energized magnet RCRM closes contacts 112 and prepares a circuit through the reset motor RM. The circuit may be followed from line 101 through wire 113, contacts 112, wire 114, magnet ZBCM, wire 115, motor RM and contacts L4 to line 100. Contacts P4 close to hold the reset motor circuit for the portion of the cycle following the time that contacts P3 open. The motor RM operates to adjust the type bars 63 under control of impulses through the commutators in accumulators to print a total, and also actuates the reset shaft to restore the accumulator wheels to zero position.

The magnet ZBCM is a zero button control magnet which closes contacts 116 and prepares a circuit for zero button magnets ZBM which are placed in the various accumulators to automatically connect the reset shaft 52, Figs. 2 and 7, to the reset motor RM so that the accumulator wheels are automatically returned to zero on a total taking operation. The circuit is traced from line 101 through wire 117, bus bar 118, a series of magnets ZBM1—ZBM5 in parallel, contacts 116, contacts 119 closed when cards are under the lower brushes, wire 120, contacts 121 and wire 122 to line 100.

There is another magnet LTCM which is energized when the resetting motor is brought into operation for total taking and resetting. This magnet controls the energization of other magnets LTR that are used to connect the printing control magnets PM to the commutators in the accumulators and at the same time disconnecting them from the card sensing brushes LB. In the lower part of Fig. 8a it is seen that magnets LTR close contacts 123 and open contacts 124 to condition the print magnets PM for total printing. The energization of magnets LTR is brought about through a circuit from line 101 through wire 117, bus bar 118, magnets LTR in parallel contacts 125 closed by magnet LTCM, wire 126 and wire 122 to line 100.

Many of the circuits in the machine are closed and opened according to whether or not cards are under the upper and lower brushes UB and LB. The presence of cards in such positions is manifested by the closing of contacts UCL1 and LCL1 as noted in Fig. 6. These contacts are in series with, and control the energization of, a number of relay magnets UCLR and LCLR as seen at the bottom of Fig. 8. There the circuit through contacts LCL1 may be traced from the main line 101 through wire 127, contacts LCL1, magnets LCLR1-4, bus bar 128 and wire 122 to line 100. The other circuit includes line 101, wire 129, contacts UCL1, magnet UCHR, magnets UCLR1-3 and wire 122 to line 100. Magnet UCHR closes a holding circuit through contacts 130, contacts L7 and wire 131 to hold the magnets UCLR energized until the last card reaches the lower brushes.

Figure 8:
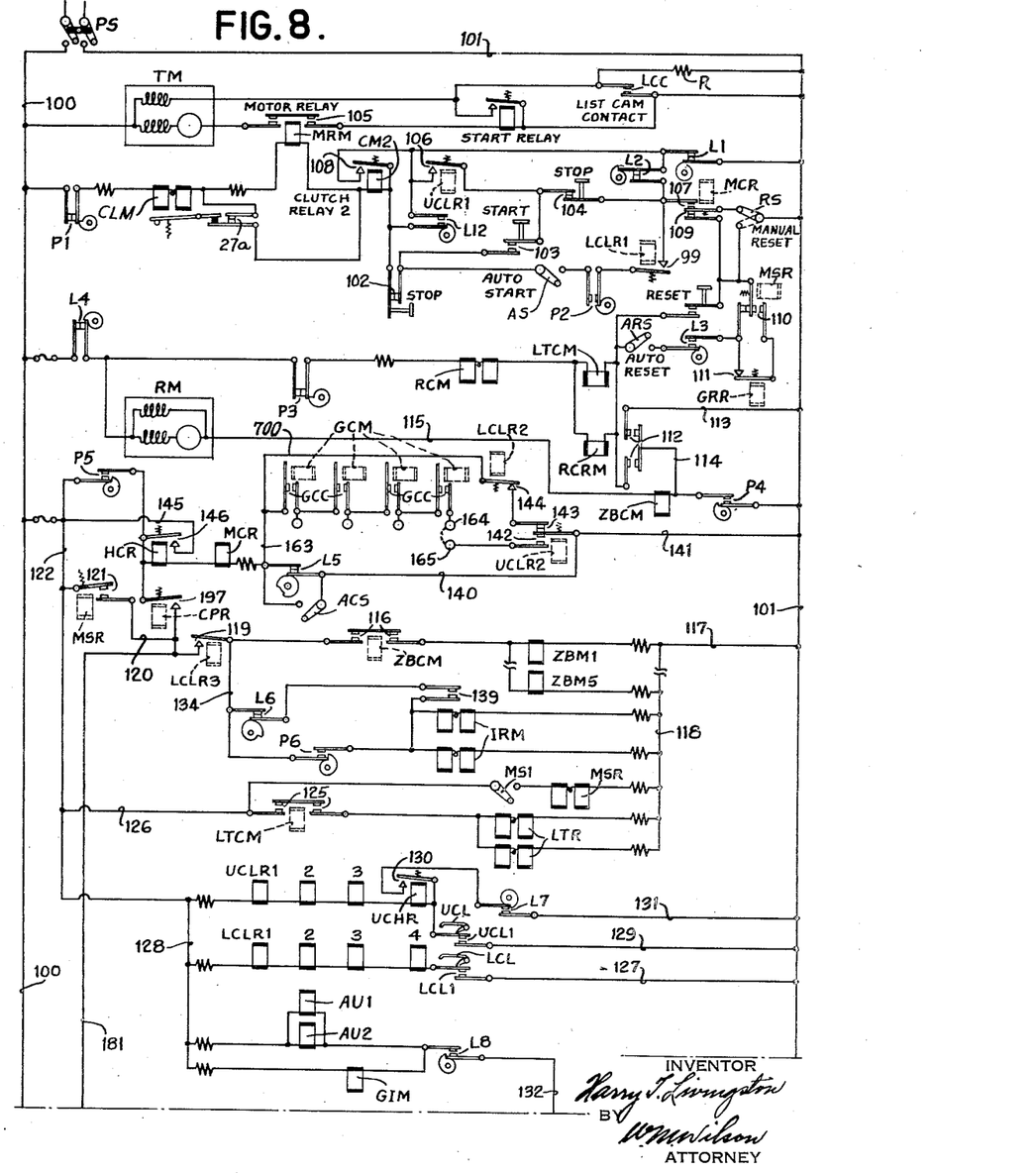
Figs. 8 and 8a taken together form a wiring diagram of the machine.

The additional unit entry magnets AU and a group indicating magnet GIM are adapted to be controlled with the same timing, therefore, they are connected in parallel at the bottom of Fig. 8. The purpose of the magnets AU is known to be the entry of additional units as explained hereinbefore with reference to Fig. 2. The purpose of magnet GIM is to disconnect certain of the accumulators from the sensing brushes after the entry of an item. Both magnets AU and GIM are energized during every card reading cycle by the closure of contacts L8. The circuit through the magnets may be followed from line 100 through wire 122, wire 128, magnets AU1, AU2, and GIM in parallel, contacts L8 closed momentarily at "1" in each item entering operation, wire 132, Fig. 8a, contacts 133 closed while cards are feeding, and then through the impulse distributor ID to line 101.

The control is such that magnets AU enter additional units and magnet GIM opens associated contacts GIC near the end of the first cycle, in readiness for comparison of subsequent entries in a manner to be explained. The contacts GIC remain open until restored mechanically during a resetting operation in a well known manner as revealed in the patent to C. D. Lake, No. 1,822,594, issued September 8, 1931.

Figure 8A:
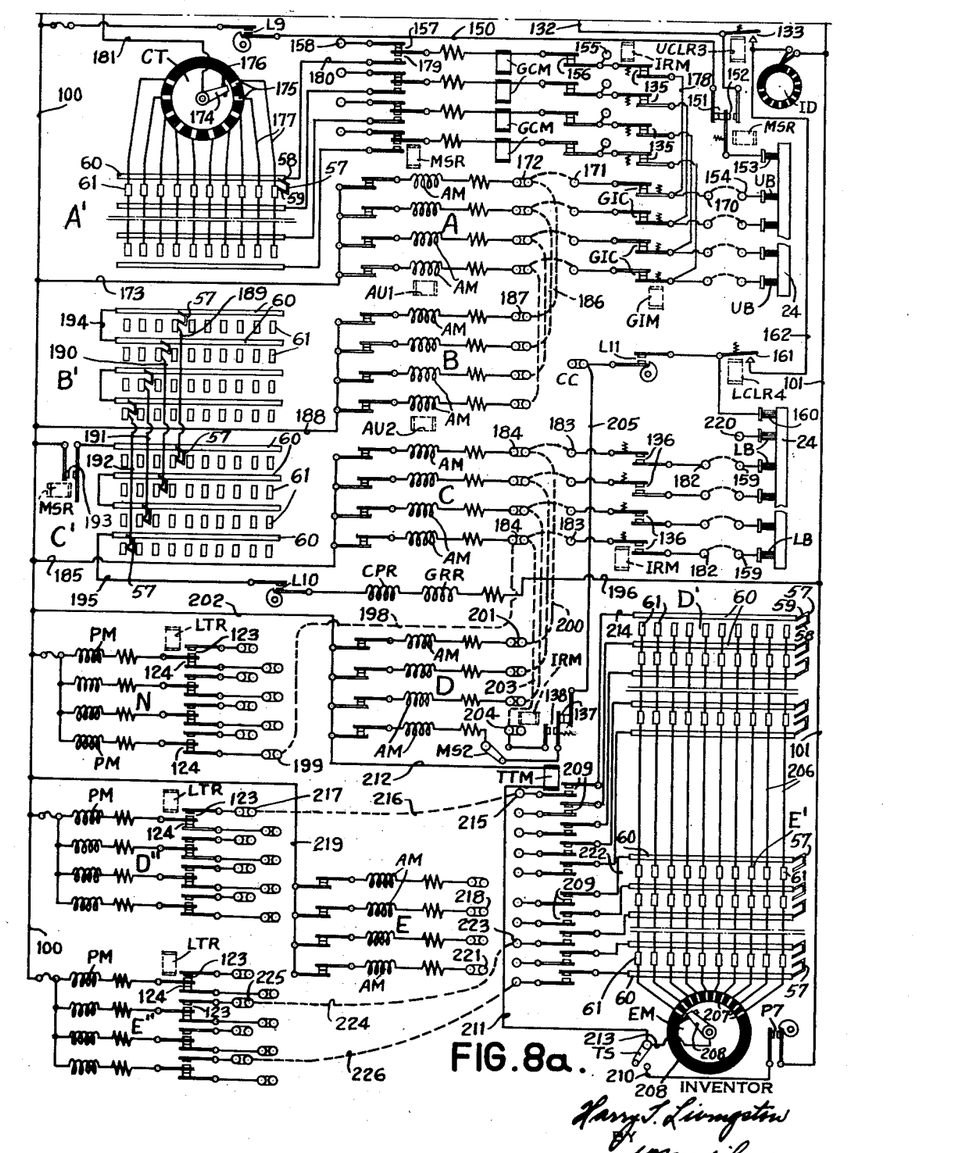
Figure 9:
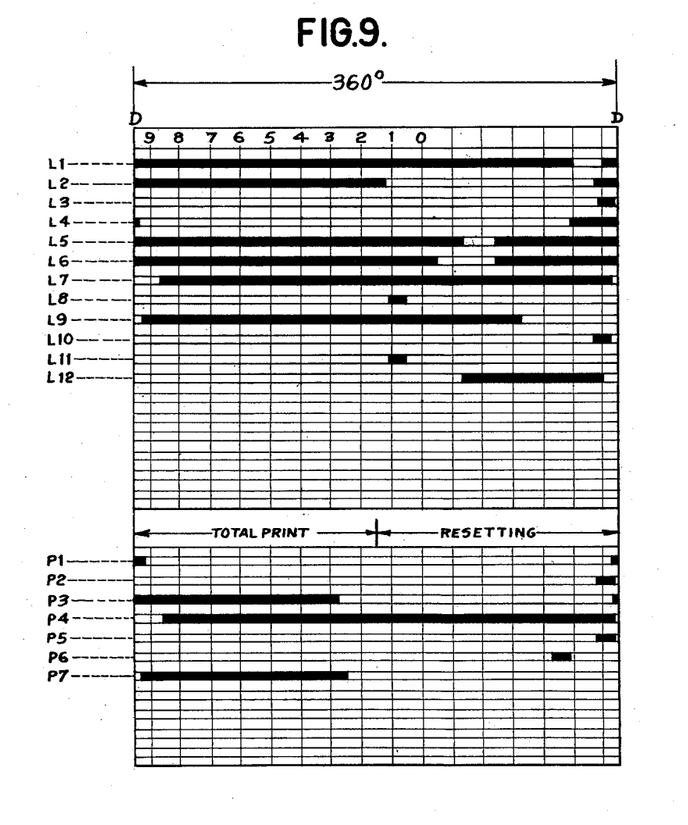
Fig. 9 is a timing diagram of the cam contacts in the machine.

A number of magnets IRM, Fig. 8, are provided to operate associated contacts 135, 136, 137 and 138, Fig. 8a, on the first card reading cycle after a reset cycle and release them for all succeeding cycles until a total is taken. These magnets are in series with a pair of contacts P6 which are closed momentarily near the end of each totaling and resetting operation. The circuit may be followed from line 100 through wire 122, contacts 121, wire 120, contacts 119, wire 134, contacts P6, magnets IRM in parallel, bus bar 118 and wire 117 to line 101. An energized magnet IRM attracts related contacts 139, closing them to form a holding circuit through the magnets. The holding circuit is maintained during the first card reading cycle by the continued closure of other contacts L6 in series with contacts 139. These contacts L6 open after the amount entering portion of each item entering cycle. The holding circuit which is in effect for the main part of every initial card reading cycle may be traced from line 100 through wire 122, contacts 121, wire 120, contacts 119, wire 134, contacts L6, contacts 139, magnets IRM, bus bar 118 and wire 117 to line 101.

The machine is provided with group control devices which are operated under control of group number of serial number perforations on the record cards. These devices serve to keep the machine running as the data relating to a group of similarly classed records are being accumulated. Then, when a group change occurs, the TM motor is deenergized, tabulating and card feeding is stopped, and the resetting motor RM is energized to print a total and reset the accumulators. The setting up of the circuits for the group control may be best explained by following the machine operation from the very start.

When the machine is started, a key operated reset cycle is followed by two start cycles during the latter of which, contacts L5 open to deenergize relay MCR and then the contacts 109 are closed and contacts L3 close late in the cycle to initiate the operation of the reset motor RM for an automatic reset cycle. When contacts L5 open during the first or key operated start cycle, they are shunted by contacts 144 and 143, since at the time contacts L5 open, the first card will not have reached the upper card lever; later in the cycle it reaches there but not at the time contacts L5 open. The two start cycles serve to feed two cards from the magazine and the presence of cards directly above both sets of brushes serves to energize both magnets UCLR2 and LCLR2 thereby closing contacts 142 and opening contacts 143 and 144. This closure of contacts 142 connects a series of group control contacts GCC in the circuit of magnet MCR. It is the purpose of these contacts to keep the magnet MCR energized and the tabulating motor running as long as successive card perforations agree. They act as a shunt around the contacts L5 which open after the index point sensing portion of each operation to test the closure of contacts GCC. At the end of the secondary reset cycle, the contacts P5 are closed momentarily and serve to set up the group control devices by energizing the tabulating motor control relay MCR. The circuit is from line 100, through contacts P5, holding magnet HCR, magnet MCR, contacts L5, wire 140, and wire 141 to line 101. The energized magnet MCR closes contacts 107 and starts the tabulating motor to feed the first card which is already beyond the upper brushes, past the lower brushes. The holding circuit for magnet MCR may be followed from line 100, wire 145, contacts 146, magnet HCR, magnet MCR, contacts L5, wires 140 and 141 to line 101.

The circuit through contacts 143, 144 and wire 100 serve to keep the machine from stopping and resetting when no cards are in the feed rollers. It also serves to cause the machine to reset and take a total as the last card passes under the lower brushes LB by holding LCLR2 energized as L5 opens.

As the last card of a stack passes under the lower brushes, the magnet MCR is automatically deenergized and a total taking and resetting cycle is initiated. Since at this time no card appears under the upper brushes, magnet UCLR2 is deenergized and contacts 142 are opened. Contacts 144 are held open since there is still a card under the lower brushes. And contacts L5 open at the testing time to deenergize MCR and initiate a reset cycle. The group control devices may be used in two ways; namely, in the ordinary way to compare for similar group numbers on successive cards, and in a special way to compare for consecutive group numbers on successive cards. Considering first the ordinary way, it is assumed that the switch MS1 is opened and the cards being sensed are perforated with similar group numbers in separate groups. Then the motor TM will continue to operate as long as the group number perforations of the successively fed cards continue to coincide. The comparing of the group number perforations on successive cards is done by a set of group control magnets GCM, Fig. 8a, wired in series between the upper and lower brushes UB and LB which sense the group number columns of index points on the cards. These magnets GCM control the closing of the contacts GCC, Fig. 8, already mentioned. The circuit including one of these magnets GCM may be traced from the main line 100, Fig. 8a, through contacts L9, wire 150, contacts 151 closed when not under special control, common brush 153, contact roller 24, upper brush UB effective through a hole in the card, plug socket 154, a plug wire (not shown) to plug socket 155, contacts 156, magnet GCM, contacts 157 closed when not under special control, plug socket 158, a plug wire (not shown) to socket 159, lower brush LB, roller 24, common brush 160, contacts 161, wire 162 and impulse distributor ID to line 101.

If the perforations sensed coincide in position, the magnet GCM will be energized and act to close associated contacts GCC. These contacts are in a circuit including the motor control relay magnet MCR which serves to maintain the machine in operation as long as the contacts GCC remain closed. They are held closed during the cycle by means of mechanical controls as set forth in Patent 1,822,594 already mentioned. The circuit through contacts GCC and magnet MCR may be followed from the main line 100 through wire 145, contacts 146, magnet HCR, magnet MCR, wire 163, a number of contacts GCC in series, plug socket 164 and a plug wire to socket 165, contacts 142 closed when cards are feeding, and wire 141 to line 101. Should any of the magnets GCM fail to energize because of a change in group number, then the related contacts GCC fail to close and the magnet MCR is deenergized to allow the associated contacts 107 to open and deenergize the driving motor TM. The machine is then conditioned to print totals and reset the accumulators under control of the reset motor RM operating in the usual way.

Before describing the details of construction of the devices in the present invention, it is believed advisable to explain briefly the mode of operation and the manner in which the perforated record cards are compared to ascertain whether the numbers thereon are in consecutive order.

Referring to Fig. 8a it is noted that five accumulators A, B, C, D and E are provided in the machine. Associated with the five accumulators are related commutator devices A', B', C', D' and E' such as that shown at the top of Fig. 1. A pair of banks of printing control devices D" and E", Fig. 8a, are provided to print the totals of amounts accumulated in accumulators D and E, respectively. Another bank of printing devices N is provided to print the first number of each series of numbers.

The three accumulators A, B and C are used to compare the numbers on successive cards to determine if they are in consecutive order. Accumulator A receives the number on the second card of each group and sets the commutators A' accordingly. Thereafter, a unit is added in A before every card reading cycle, whereupon the settings of A' are compared with the upper brush readings of the numbers on successively fed cards which agree with the setting of A' when consecutively numbered. The comparison is made by connecting the regular group control magnets GCM between the upper card sensing brushes UB and the segments 61 of commutators A'. Thus, with the number of the second card, plus one in A', the number on the third card being analyzed by the upper brushes UB, there should be a coincidence of numbers and all connected magnets GCM be energized to continue card feeding. A contactor CT is connected to the segments 61 in commutator A' and is driven in synchronism with the feeding of the cards under the upper brushes UB. This is done so that the various segments 61 are made effective at the same time that corresponding index points are presented under the upper brushes UB. For example, the "9" segments 61 are connected in the circuit at the same time that the "9" index points on the card are under the upper brushes UB, the "8" segments are connected with brushes UB when "8" index points are sensed, etc. If the numbers on two successive cards are not consecutive, the readings of A' and the upper brushes UB will not coincide, and one or more of the magnets GCM is deenergized with the usual result that card feeding is stopped and a total is printed.

It may be noted that when a change in consecutive numbering occurs, the first card of the new group has passed the upper brushes UB to which the commutators A' are connected. It is for this reason the commutators A' are not adapted to compare the first and second cards of all groups. Therefore accumulators B and C are provided to compare the first and second cards of all groups. The second and third cards and all following cards of all groups are compared between A' and the upper brushes UB in the manner explained hereinbefore.

When a total is taken on a group change, all accumulators except accumulator C are restored to zero. The units order wheel in C is adapted to retain the amount 2 as explained with reference to Fig. 7. To the 2 in C is added the number on the first card of each new group. At the same time the number on the second card is added in accumulator B and an additional unit is added therein. The composite numbers in both accumulators coincide when the cards are numbered consecutively. Therefore, the settings of commutators B' and C' should coincide and series connections between corresponding segments 61 in the two commutator devices should form a complete circuit. Such series connections are provided, and when a circuit fails to form it is a sign that the first and second cards of a series are not consecutively numbered. Then a total taking and resetting operation is initiated to clear the accumulators and start the comparing of a new group.

The printing devices N are connected to the lower brushes LB and act to print the first number of each group. An example of such printing may be seen in Fig. 4 where the numbers 2510, 2527 and 2571 appear on the left of record sheet 73.

The accumulator D is provided as a means for controlling the printing of the last number of each group. It is connected to the lower brushes to add the number appearing on the first card of each group. After the first card passes, the connections to the lower brushes LB are opened and a unit is added in D for each following card reading cycle. In this way accumulator D serves to add a total amount which is equivalent to the consecutive number on the last card of a group. When a total is taken, the commutators D', adjusted by accumulator D, serve to control the printing devices D" so that the last number of a group, such as number 2516*, Fig. 4, is printed on sheet 73. It should be noted that the number is printed without sensing the card carrying the number.

The accumulator E is split in two sections. The one section of E is used to count the number of cards in each group. The other section of E is used to add the amounts appearing on all cards of each group, such as the amount $10.92 on card 20 of Fig. 3. Through connections to the lower brushes LB the amounts are read into accumulator E. When a total taking operation is effected, the commutators E' adjusted by accumulator E are used to direct impulses emitted by an emitter EM into printing devices E" to cause the printing of the total number of cards in a group and the total of amounts therein. An example of such printing may be noted by observing the 7* and the 249.76* on the first line of the record sheet 73 in Fig. 4.

With the foregoing outline of operations in mind it is believed that it will be easy to follow the description set forth hereinafter with reference to the electrical connections in Fig. 8a. It is assumed that the switch MS1 is closed and switch MS2 is rocked down to the lower closing point, and magnets MSR energized to select control for comparing consecutively numbered cards. It is also assumed that the record cards 20 are arranged in groups with the numbers thereon in consecutive order within each group.

As the first card passes under the upper brushes during the auto start cycle, the number thereon is added in accumulator A. However, the secondary reset cycle follows directly thereafter, and the accumulator is zeroized. Therefore, on the next card feed cycle, which is the secondary auto start cycle, comparing starts with the addition of the number on the first card in accumulator C and addition of the number on the second card in accumulator B and, at the same time, as the second card passes under the upper brushes UB, the number (such as number 2510, Fig. 3) perforated therein is added in accumulator A. An adding circuit through one denominational order of accumulator A may be traced from line 101, through impulse distributor ID, contacts 133, contacts 152, brush 153, roller 24, brush UB, plug socket 154 and a plug wire to socket 170, contacts GIC closed for the first cycle, plug socket 171 and a plug wire to socket 172, magnet AM and wire 173 to line 100. Energized magnet AM clutches gear 37, Fig. 1, to add the number on the card. At the same time the magnet AU1, Fig. 8 is energized and serves to release the carrying devices in the units order, Fig. 2, so that an additional unit is added in the accumulator A, Fig. 8a, at the end of the first cycle. Thus the accumulator A contains the third consecutive number. This number is set up in commutator device A' by gears 55, Fig. 1, between accumulator gears 37 and brush holders 57.

After the number entry into accumulator A, magnet GIM, Fig. 8a, acts to open contacts GIC and prevent further entries therein from the upper brushes UB. However, a unit is added in A on every cycle by means of the successive energizations of magnet AU1.

The numbers on the third card and following cards are compared with the numbers in commutator devices A'. The segments 61 in A' are made effective seriatim through a contactor CT having a moving brush 174 adapted to successively engage spots 175 arranged around an insulated ring 176. From the spots 175, separate series connections 177 are made to all segments 61 in similar positions on the commutators of A'. Brush holder 174 is moved in synchronism with the feeding of the card so that as the "9" segments 61 are in the circuit, the "9" index points in the card are under the upper brushes UB. In this way a comparison is made between the number in the card and the number in A'. They agree when the cards following the second card are consecutively numbered. The comparing circuit may be followed from line 101 through distributor ID, contacts 133, contacts 152, brush 153, roller 24, brush UB, socket 154 and plug wire to socket 170, wire 178, contacts 135 closed after the first cycle, contacts 156, group control magnet GCM, contacts 179, wire 180, sector 60, brush 58, holder 57, brush 59, segment 61, wire 177, spot 175, brush and holder 174, wire 181, Fig. 8, wire 120, contacts 121 and wire 122 to line 100. If there is agreement in all orders, all magnets GCM are energized, and the series of contacts GCC, Fig. 8, are closed to keep the motor control magnet MCR energized so that the motor TM is kept in operation to feed and sense the cards. Should there be disagreement in any order, the corresponding magnet GCM is not energized and a total taking and resetting operation is initiated. Such disagreement would occur in the tens order if the cards are numbered as set forth in the example shown in Fig. 4.

There it is noted that a card numbered 2527 followed a card numbered 2516. When this disagreement is noted, the first card of the new group is already past the upper brushes UB, therefore the number 2527 cannot be put into accumulator A for comparison, but other means must be provided to compare the number 2527 with the number on the second card which is supposed to be 2528. This other means takes the form of the accumulators B and C which are reset at the end of the first group.

The accumulator C is not reset all the way, but is zeroized in all orders but the units order. There the amount 2 is retained as explained hereinbefore.

After the total taking and resetting operation, the number on the first card of any group is added in accumulators C and D at the same time that the number on the second card is added in accumulators A and B. The circuit through accumulator C may be followed from line 101 through impulse distributor ID, wire 162, contacts 161, brush 160, roller 24, brush LB, socket 159 and a plug wire to socket 182, contacts 136 closed on the first cycle, plug socket 183 and a plug wire to socket 184, magnet AM and wire 185 to line 100. Thus the number on the first card of the second group is added to the amount 2 already in accumulator C. In the example taken, the result is 2527+2=2529. The circuit through accumulator B may be traced from line 101 through distributor ID, contacts 133, contacts 152, brush 153, roller 24, brush UB, socket 154 and a plug wire to socket 170, contacts GIC, socket 171 and a plug wire to socket 172, another plug wire 186 to socket 187, magnet AM and wire 188 to line 100. Thus the number on the second card of the second group is added in the accumulator B. At the end of the adding operation another unit is added in accumulator B by the magnet AU2. In the example assumed, the result is 2528+1=2529 which is the same as the number in accumulator C.

The numbers in the two accumulators B and C are compared by comparing the settings of the associated commutator devices B' and C'. Each segment 61 in B' is connected to a corresponding segment 61 in C' by wires such as wires 189, 190, 191 and 192. A testing circuit is directed through both commutators B' and C' when the contacts L10 close at the end of the adding cycle. The circuit may be followed from line 100 through contacts 193, sector 60, brush holder 57, segment 61 in C', wire 189, segment 61 in B', brush holder 57, sector 60, wire 194, sector 60 in the next order, holder 57, segment 61, wire 190 to C', etc. back and forth, connecting order after order in series, wire 192 connecting to a units order segment 61, holder 57, sector 60, wire 195, contacts L10, control pickup relay magnet CPR, group reset magnet GRR and wire 196 to line 101. If the settings of the two devices B' and C' coincide, as they do in the example taken, the magnets CPR and GRR are energized to prevent the taking of a reset cycle and to maintain the card feeding and tabulating operation of the machine.

The magnet CPR closes contacts 197, Fig. 8, late in the first cycle and energizes magnet MCR after the earlier deenergization of the same due to the momentary opening of contacts L5. The pickup circuit may be followed from line 100 through wire 122, contacts 121, wire 120, contacts 197, magnet HCR, magnet MCR, contacts L5, wire 140 and wire 141 to line 101. To insure the prevention of a reset cycle, magnet GRR opens contacts 111 just before contacts L3 close in line with the reset motor control circuit. Thus, magnet MCR is maintained energized and motor TM continues to operate to feed and sense cards after the first and second cards when these two cards are numbered consecutively.

If the two cards should contain numbers not in consecutive order, then the settings of B' and C' would not coincide and a break would appear in the connections between the commutators. When contacts L10 closed, the magnets CPR and GRR would not be energized and therefore magnet MCR would not be reenergized after L5 opens. The result is that a reset cycle is initiated immediately after the comparison which reveals that the first card is in a single card group which stands alone without consecutively numbered cards before or after it.

The change in comparing control from accumulators B and C back to accumulator A may be explained as follows: Since magnet IRM closes contacts 136 in line with accumulator C only on the first cycle after an auto reset cycle, only the number on the first cards of all groups is entered into accumulator C. Accumulator B, through contacts GIC, is operated to add the number on the second card, which is sensed by the upper brushes UB, at the same time that accumulator C is controlled by the first card under the lower brushes LB. After accumulators B and C receive the first two members of a group, contacts GIC and 136 are opened to prevent further entries therein until a new group is encountered.

Because of the closed condition of contacts GIC at the time the second card is passing the upper brushes UB, the number on this card is added in accumulator A at the same time it is added in accumulator B. Thus, the numbers on all second cards in all groups are added in accumulator A. After the reception of the entry from the second card, contacts GIC are opened and contacts 135 are permitted to close so that comparisons are made between the total in accumulator A and the upper brushes UB for all cards after the second.

After the comparison cycle between accumulators B and C, accumulator B continues to receive unit entries from operation of magnet AU2. These entries serve to make the number in accumulator B different from the number in accumulator C on all cycles after the first, and magnets CPR and GRR will not be energized and, therefore, disagreement in consecutive numbering found between accumulator A and the upper brushes may effect a reset cycle without interference by magnets CPR and GRR.

Attention may now be directed to the printing devices N, D″ and E″ and the accumulators D and E which are not used in comparing.

The printing devices N are connected to the lower brushes LB to print the first consecutive number of each group of numbers. The number is sensed on the first card of each group. During each reset cycle, including the secondary auto reset cycle of the initiating operations, contacts P6 close to make magnet IRM effective. This magnet in turn closes contacts 136. Since this happens when the first card of a group is about to pass under the lower brushes, the first listing cycle effects operation of the print bank N. A typical circuit may be outlined on the diagram by noting line 101, the distributor ID, wire 162, contacts 161, brush 160, roller 24, through the card by brush LB, socket 159 and plug wire to socket 182, contacts 136, socket 183 and plug wire to socket 184, a plug wire 198 to socket 199, contacts 124, magnet PM and main line 100. The contacts 136 are closed only for the first cycle after the taking of a total and reset cycle, therefore only the numbers on the first cards of each group are recorded by the devices N as noted by the column of figures on the left in Fig. 4. Recording of the first number occurs at the same time that comparison is made between the first and second cards.

The accumulator D, the commutator D' and the printing devices D″ are provided for the purpose of printing the last number of each group. Accumulator D adds the first number on the first card of each group as the card passes under the lower brushes. The adding circuit may be traced from line 101 through impulse distributor ID, wire 162, contacts 161, brush 160, roller 24, brush LB, socket 159 and a plug wire to socket 182, contacts 136, socket 183 and a plug wire to socket 184, another plug wire 200 to socket 201, adding magnet AM and wire 202 to line 100. This circuit is effective only by the closing of contacts 136 for the first card of each group in the same manner and at the same time that the devices C and N are controlled from the lower brushes LB.

It should be noted that the impulses through the units order of accumulator D are directed through selective switching devices. The plug wire 203 runs to socket 204 and from there the circuit passes around through contacts 138 (closed for the first adding cycle) switch MS2 moved down and closed for comparing control, and then through magnet AM and wire 202 to line 100. Directly after the adding portion of the first cycle, contacts 137 are allowed to close and therefore a unit is added in accumulator D for each card of a group after the first. At this point it may be well to note than an entry other than unity could be made where the successive cards carry numbers in an arithmetical progression with a difference other than unity. The unit entering circuit may be followed from line 101 through distributor ID, wire 162, contacts 161, contacts L11 closed to initiate an impulse at the "1" point in the adding cycle, wire 205, contacts 137, switch MS2, magnet AM and wire 202 to line 100. The contacts L11 close for each card reading cycle so that any number of units may be entered thereby. In this way the last number of a group is totaled without reference to any card after the first card of a group. And the last number may be printed without referring to the card carrying said number.

In printing the number totaled on accumulator D, the commutator devices D' set thereby are used to control the printing devices D″. The brush holders 57 in D' are adjusted to contact various segments 61 according to the number registered on D. All segments 61 relating to the same digit are connected by a bus bar 206 which leads to one of a series of spots 207 arranged around an insulated ring 208 of emitter EM. The bus bars 206 are also connected to devices E' and D' and EM. Ten such bus bars and spots are provided to take a reading of the amounts set up on the commutators of devices E' and D'. A brush holder 208 in the emitter EM establishes momentary contact with each of spots 207 in order according to the value of the digit represented thereby. The holder 208 is moved only on total and reset operations. It moves in synchronism with the lifting of the type bars in printing devices D″ and E″ so that timed impulses through bars 206 are selected by positioned brush holders 57 and directed through print control magnets PM to stop the type bars in positions corresponding to the positions of the holders 57. Before the total can be printed adjustments must be made to connect the devices D' to the printing devices D″. The connections are made through contacts 209 which are closed under control of a total trip magnet TTM. The circuit for energizing magnet TTM runs from line 101 through contacts P7 closed early in a resetting cycle, wire 210, switch TS closed when total printing is desired, wire 211, magnet TTM, wire 212 and wire 202 to line 100.

With all connections made, the total taking operation continues to print the record over print controlling circuits similar to the following: from line 101 through contacts P7, wire 210, switch TS, wire 213, brush holder 208, a spot 207, bus bar 206, a segment 61 in D', brush 58, holder 57, brush 59, sector 60, wire 214, contacts 209, socket 215 and plug wire 216 to socket 217, contacts 123 closed by magnet LTR on totals, and then through magnet PM to line 100. The result is the printing of a number such as those in the second column from the left on the sheet 73 in Fig. 4.

The accumulator E is split in two parts, the one part to act as a counter to add the number of cards in each group, and the other part to accumulate the amounts appearing on cards of a group. Although only a few banks are shown as constituting accumulator E it is understood that a larger number of banks may be provided.

The counting part of accumulator E receives an impulse in the units order in time to add a unit on every card feeding cycle as cards pass under the lower brushes. The unit impulse circuit through the counter part of accumulator E may be followed from line 101 through distributor ID, wire 162, contacts 161, contacts L11 closed just before the end of the adding portion of a cycle, socket CC and a plug wire to socket 218 in E, then through magnet AM and wire 219 to line 100. The energized magnet AM acts to clutch the accumulator driving parts to turn gear 37, Fig. 1, one step on each operation.

At the same time that the one portion of accumulator E is counting, the other portion is adding amounts, such as the amount 10.92 on card 20 in Fig. 3, as the cards pass the lower brushes. A card sensing and amount adding control circuit may be outlined on the diagram in Fig. 8a. It includes line 101, distributor ID, wire 162, contacts 161, brush 160, roller 24, brush LB, socket 220 and a plug wire to socket 221, magnet AM, wire 219 and line 100. Over circuits such as this all the amounts on the cards of a consecutively numbered group may be totaled and recorded. To carry out the recording part of the operation, the accumulator E adjusts the commutator devices E' which in turn control the operation of printer E'' on total taking and reset operations.

The emitter EM serves to take a reading of devices E' and control print devices E'' in the same way that devices D' were read to control printer D''. A sample total printing circuit may be followed through E' via line 101, contacts P7, wire 210, switch TS, wire 213, brush holder 208, spot 207, bus bar 206, a segment 61 in E', brushes and holder 57, sector 60, wire 222, contacts 209, socket 223 and plug wire 224 to socket 225, contacts 123, magnet PM and line 100. The other portion of devices E' is connected in a similar way by plug wire 226. In this way the printing devices E'' operate to print both figures added on accumulator E. The figures are recorded the same as the number 7 and the amount 249.76 on the top line of the sheet 73 shown in Fig. 4.

It should be noted that all three totals are recorded at the same time. The last number, the number of cards in a group and the amount are printed in one operation and placed in line with the first number in the group. An example of this is seen in Fig. 4 where the number 2510 was first printed on the left. Nothing further was printed until the comparing means determined that a card with number 2516 was followed by a card numbered 2527 breaking the sequence of numbers. Then a total taking and resetting operation was initiated to print the last number 2516, the number showing that there are 7 cards in the group, and the amount 249.76 which is the total of the amounts in the consecutively numbered card group. After the total printing and resetting operation, the number 2527 on the first card of the new group is printed on the left and the machine continues to operate to compare and record the consecutive numbers and related totals.

Since the basic novel features of the invention are clearly shown and described it will be understood that various omissions, substitutions and changes in the form and details of the devices illustrated, and changes in operation may be made by those skilled in the art without departing from the spirit of the invention. It is the intention, therefore, to be limited only as indicated by the scope of the following claims.

What is claimed is as follows:

1. An accounting machine controlled by groups of record cards, each card bearing a serial number representation, said cards being arranged in consecutive order, means for feeding the cards in succession, means for sensing the number representations on the cards, means under control of said sensing means for determining whether the first and second cards of a group bear serial number representations in serial order, means under control of said sensing means for determining whether the second card, and cards following the second card, bear representations following in serial order, an accumulator, means cooperating with said sensing means for causing a serial number entry to be made in said accumulator from the first record only of a group, means for adding a unit in said accumulator for each additional card of the group, means under control of said sensing means and said causing means for printing the first serial number of each group, and means under control of said accumulator and selectively called into operation by either of said determining means for printing the last serial number of each group.

2. In a machine controlled by groups of record cards bearing number representations, the values of which vary in arithmetical progression with one number representation on each card and all cards arranged in consecutive order, means for sensing the number of representations on the cards, an accumulator, means for cooperating with said sensing means for causing a number entry to be made in said accumulator from the first card only of a group, means under control of said sensing means and said causing means for printing a record of the number representations on the first card of each group, means for adding an amount equal to the common difference of the progression in said accumulator on every card sensing operation after the operation sensing the first card of the group, means under control of said sensing means for determining whether the first and second cards of a group bear number representations varying according to arithmetical progression, means under control of said sensing means for determining whether the second card and cards following the second card bear representations varying in arithmetical progression, printing devices, and means selectively called into operation by either of said determining means and under control of said accumulator for operating said printing devices to print a record of the last number of each progression.

3. In a machine for recording the arrangement of groups of consecutive numbers appearing on records, said records bearing representations of consecutive numbers, means for feeding said records in succession, means for sensing said representations on the records, an accumulator, means cooperating with said sensing means for causing the entry of the number representation of the second record only of a group into said accumulator, means for entering a unit into said accumulator on each record feeding cycle, means for comparing the number representations on successive records with the total amount in said accumulator to determine whether the records bear representations of consecutive numbers, a second accumulator, means for adjusting said second accumulator to register two units, a second means cooperating with said sensing means for causing the entry of the number represented by the first record only of each group into said second accumulator, a third accumulator, means for entering a unit into said third accumulator on every operation of the machine, means under control of said sensing means and the first mentioned causing means for entering the number represented on the second record only of each group into said third accumulator, a second comparing means for comparing the total amounts in said second and third accumulators to determine whether the first and second records of a group bear consecutive number representations, means under control of said second causing means and said sensing means for recording the number appearing on the first record of each group, a fourth accumulator, means under control of said sensing means and said second causing means for adding the number represented by the first record only into said fourth accumulator, means for adding a unit in said fourth accumulator on every operation of the machine after the number entry therein, and means selectively called into operation by either of said comparing means and under control of said fourth accumulator for recording the consecutive numbers appearing on the last record of each consecutively numbered group.

4. In a machine controlled by records perforated to represent serial numbers, said records being arranged in groups within which the records are in consecutive order, means for sensing the number perforations in the records, means for feeding the records in succession, means under control of said sensing means for determining whether the first and second records of a group contain consecutive serial number perforations, an accumulator, means cooperating with said sensing means for causing a serial number entry to be made in said accumulator from the second record only of a group, means for adding a unit in said accumulator for each record of the group, means cooperating with said accumulator and said sensing means for comparing the total amounts in said accumulator with the serial number perforations in successive records, and means selectively controlled by either said determining means or said comparing means for stopping operation of the machine when a change is detected in the serial record groups.

5. In a device for determining whether records bearing serial number representations are in serial order, the combination of means for sensing said number representations, means for feeding said records successively to said sensing means, commutator devices, means under control of said sensing means for adjusting said commutator devices to represent the number appearing on one of said records, means for disconnecting said devices from said sensing means after adjustment, means for setting said devices to represent the next higher number on each successive record sensing operation, a contactor connected to said commutator devices and moved in synchronism with said record feeding means, and means cooperating with said contactor, said commutator devices and said sensing means and being operative on every operation after said devices have been adjusted for comparing the number representations of the commutators with the number representations of the successive records to detect a break in the serial order of the records.

6. In a device for determining whether record cards bearing serial number representations are arranged in serial order, the combination of means for sensing the number representations on said cards, means for feeding said cards to said sensing means in succession, an accumulator, means cooperating with said sensing means for entering the serial number from one of said cards into said accumulator, means for adding a unit in said accumulator for each card sensing operation, a readout device associated with said accumulator, and means cooperating with said readout device and said sensing means for comparing the total amount in said accumulator with the number representations sensed on a card to determine whether two successive cards are numbered serially.

7. An accounting machine controlled by groups of record cards, each card bearing a serial number representation and an amount representation, said cards being arranged in serial order, means for feeding the cards in succession, means for sensing the number and amount representations on the cards, means under control of said sensing means for determining whether the first and second cards of a group bear serial number representations in serial order, means under control of said sensing means for determining whether the second card and cards following the second card bear representations following in serial order, an accumulator, means cooperating with said sensing means for causing a serial number entry to be made in said accumulator from the first record only of a group, means for adding a unit in said accumulator for each additional card of the group, means under control of said sensing means and said causing means for printing the first serial number of each group, means under control of said accumulator and selectively called into operation by either of said determining means for printing the last serial number of each group, means for counting the number of cards in each serial group, means under control of the sensing means for adding the amounts of each group, means under control of said counting means and selectively called into operation by either of said determining means for printing a total representing the total number of counted cards in each serially numbered group, and means under control of said adding means and selectively called into operation by either of said determining means for printing a total amount of the amounts represented on the cards in each group.

8. An accounting machine controlled by groups of record cards, each card bearing a serial number representation and an amount representation, said cards being arranged in consecutive order, means for feeding the cards in succession, means for sensing the number and amount representations on the cards, means under control of said sensing means for determining whether the first and second cards of a group bear serial number representations in serial order, means under control of said sensing means for determining whether the second card and cards following the second card bear representations following in serial order, means under control of said sensing means for adding the amounts represented on said cards, means under control of said adding means for printing a total of added amounts, and means selectively called into operation by either of said determining means for initiating operation of said total printing means to record the total amount of a serially numbered group when the end of a group is detected.

9. In a device for determining whether records bearing serial number representations are in serial order, the combination of means for sensing said number representations, means for feeding said records successively to said sensing means, an accumulator, means for resetting said accumulator to hold two units, means cooperating with said sensing means for directing the number on the first record into said accumulator, a second accumulator, means cooperating with said sensing means for directing the number on the second record into said second accumulator, means for adding a unit in said second accumulator when said number is added therein, and means cooperating with both accumulators for comparing the total amounts therein to determine whether the first and second records bear number representations that are in serial order.

10. In a machine controlled by record cards representing groups of consecutive numbers with one consecutive number representation on each card and the cards arranged in consecutive order, means for feeding the cards in succession, means for sensing the number representations on the cards, means for counting the cards, means under control of said sensing means for determining whether the first and second cards of a group bear successive consecutive number representations, means under control of said sensing means for determining whether the second card and cards following the second card bear representations following in consecutive order, and means selectively called into operation by either of said determining means and under control of said counting means for printing a record of the total number of consecutively numbered cards in each group.

11. In a machine controlled by record cards representing groups of consecutive numbers with a card for each number, each card bearing a consecutive number representation, said cards being arranged in sequence according to the value of the number, means for sensing the number representations on the cards, printing means, means cooperating with said sensing and printing means for causing said printing means to print a record of the number on the first card of each group of consecutively numbered cards, an accumulator, means under control of said causing and sensing means for adding the first number of each group in said accumulator, means for adding a unit in said accumulator on each card sensing operation after the adding of the first number, means under control of said sensing means for determining whether the first and second cards of the group bear successive consecutive number representations, means under control of said sensing means for determining whether the second card and cards following the second card bear representations following in consecutive order, and means selectively called into operation by either of said determining means and under control of said accumulator for printing a record of the number on the last card of a group of consecutively numbered cards.

12. In a machine controlled by groups of record cards bearing amount representations and successive number representations the values of which numbers vary in arithmetical progression with one card for each number and associated amount and all cards arranged in consecutive order, means for sensing the number and amount representations on the cards, an accumulator, means cooperating with said sensing means for causing the number represented on the second card only of a progression to be stored in said accumulator, means for adding the common difference of said progression in said accumulator on every card sensing operation, a second accumulator, means under control of said sensing means for adding the amounts on said cards in said second accumulator, means under control of said sensing means for determining whether the first and second cards of a group bear numbers varying in arithmetical progression, means under control of said sensing means and the first mentioned accumulator for determining whether the second card and the cards following the second card bear representations following in arithmetical progression, said determining means detecting a break in the progression and a change in card group, and means selectively called into operation by either of said determining means and under control of said second accumulator for printing a total of the amounts in a group.

13. In a machine controlled by groups of record cards bearing number representations the values of which vary in arithmetical progression with one card for each number and all cards arranged in consecutive order, means for sensing the number representations on the cards, devices for feeding said cards successively past said sensing means, means under control of said sensing means for determining whether the first and second cards of a group bear numbers varying in arithmetical progression, an accumulator, means cooperating with said sensing means for causing the storing of the number on the second card only of a progression in said accumulator, a second causing means for controlling the reading of the number representation on the first card only of a progression, means under control of said second causing means and said sensing means for printing the first number of each progression, means for adding an amount equal to the common difference of the progression in the accumulator on every card sensing operation, commutators adjusted by said accumulator, machine operation control devices, an emitter connected to said sensing means through said commutators and operation control devices, means for operating said emitter in synchronism with said feeding devices to compare the number representations on the successive cards with the total amount in the accumulator to determine if the cards bear numbers which are in progression, another accumulator, means cooperating with said sensing means and said second causing means for operating said other accumulator to add the number appearing on the first card of each progression, means for adding an amount equal to the common difference of the progression in said other accumulator on every card sensing operation, and means under control of the other of said accumulators and selectively called into operation by either said operation control devices or said determining means for printing a record of the last number of a progression when it is determined that the number representations on two successive cards are not in progression.

HARRY T. LIVINGSTON.